United States Patent
Fischer et al.

(10) Patent No.: US 10,228,288 B2
(45) Date of Patent: Mar. 12, 2019

(54) METHOD FOR OPTICALLY DETERMINING THE TEMPERATURE OF A MOLTEN METAL, AND REELING DEVICE FOR CARRYING OUT SAID METHOD

(71) Applicant: MINKON GmbH, Erkrath (DE)

(72) Inventors: Harald Fischer, Mettmann (DE); Gerhard Wünsch, Mettmann (DE); Torsten Lamp, Düsseldorf (DE); Herbert Köchner, Pulheim (DE)

(73) Assignee: MINKON GmbH, Erkrath (DE)

( * ) Notice: Subject to any disclaimer, the term of this patent is extended or adjusted under 35 U.S.C. 154(b) by 162 days.

(21) Appl. No.: 15/507,667

(22) PCT Filed: Aug. 21, 2015

(86) PCT No.: PCT/EP2015/001715
§ 371 (c)(1),
(2) Date: Feb. 28, 2017

(87) PCT Pub. No.: WO2016/034272
PCT Pub. Date: Mar. 10, 2016

(65) Prior Publication Data
US 2017/0307444 A1   Oct. 26, 2017

(30) Foreign Application Priority Data
Sep. 1, 2014 (DE) .......................... 10 2014 012 697

(51) Int. Cl.
*G01J 5/04* (2006.01)
*G01J 5/08* (2006.01)
(Continued)

(52) U.S. Cl.
CPC ............... *G01J 5/004* (2013.01); *G01J 5/029* (2013.01); *G01J 5/0821* (2013.01);
(Continued)

(58) Field of Classification Search
CPC ................................. G01J 5/004; G01J 5/029
See application file for complete search history.

(56) References Cited

U.S. PATENT DOCUMENTS 4,284,249 A * 8/1981 Legallasi ................ B63B 35/03
242/388.7
4,560,314 A * 12/1985 Fohler .................... G01N 1/125
414/276

(Continued)

FOREIGN PATENT DOCUMENTS

| CA | 2522366 A1 | 1/2005 |
|---|---|---|
| CN | 1043589 C | 6/1999 |

(Continued)

OTHER PUBLICATIONS

International Search Report dated Dec. 23, 2015 for related PCT Application No. PCT/EP2015/001715.

*Primary Examiner* — Clayton E Laballe
*Assistant Examiner* — Leon W Rhodes, Jr.
(74) *Attorney, Agent, or Firm* — Howard IP Law Group

(57) ABSTRACT

A method for optically determining the temperature of a molten metal with a measuring device, including calibrating a replacement measuring chain by a measuring chain as a system-internal measuring standard. The measuring device includes an optical waveguide, to guide electromagnetic radiation emitted from the metal or from the tip of the optical waveguide to an optical detector, at least one replacement optical waveguide, an optical detector for determining the temperature of the metal from an analysis of the electromagnetic radiation, a measuring chain, in which the optical waveguide is the measurement recorder, and at least one replacement measuring chain, in which a replacement optical waveguide is the measurement recorder. A reeling device includes a conveying device for successive reeling of the optical waveguide from a stock and of the replacement (Continued)

optical waveguide from a replacement stock, a receiving device for a stock and at least one replacement stock.

20 Claims, 1 Drawing Sheet

(51) Int. Cl.
  *G01J 5/00* (2006.01)
  *G01J 5/02* (2006.01)
  *G01J 5/54* (2006.01)
(52) U.S. Cl.
  CPC ............... *G01J 5/0871* (2013.01); *G01J 5/54* (2013.01); *G01J 2005/0048* (2013.01)

(56) References Cited

U.S. PATENT DOCUMENTS

| | | | |
|---|---|---|---|
| 5,730,527 | A | 3/1998 | Takayama et al. |
| 6,004,031 | A | 12/1999 | Takayama et al. |
| 6,293,696 | B1 | 9/2001 | Guardado |
| 8,038,344 | B2 | 10/2011 | Lamp et al. |
| 2005/0157772 | A1 | 7/2005 | Fischer et al. |
| 2005/0175065 | A1 | 8/2005 | Coleman, Jr. |
| 2009/0074028 | A1 | 3/2009 | Lamp et al. |
| 2012/0327971 | A1 | 12/2012 | Jyoti Gota |

FOREIGN PATENT DOCUMENTS

| | | |
|---|---|---|
| CN | 1820190 A | 8/2006 |
| CN | 102768073 A | 11/2012 |
| DE | 695 16 510 T2 | 11/2000 |
| DE | 103 60 676 A1 | 7/2005 |
| DE | 10 2011 011 450 A1 | 8/2012 |
| EP | 0655613 A1 | 5/1995 |
| EP | 0747682 B1 | 4/2000 |
| EP | 2 799 824 A1 | 11/2014 |
| GB | 1 166 887 A | 10/1969 |
| JP | S60-151 524 A | 8/1985 |
| JP | S62132135 A | 6/1987 |
| JP | H07-140007 A | 6/1995 |
| JP | H07-324982 A | 12/1995 |
| JP | H07-324983 A | 12/1995 |
| JP | H09-101205 A | 4/1997 |
| JP | 4523181 A | 8/2010 |
| WO | 2007/079894 A1 | 7/2007 |

\* cited by examiner

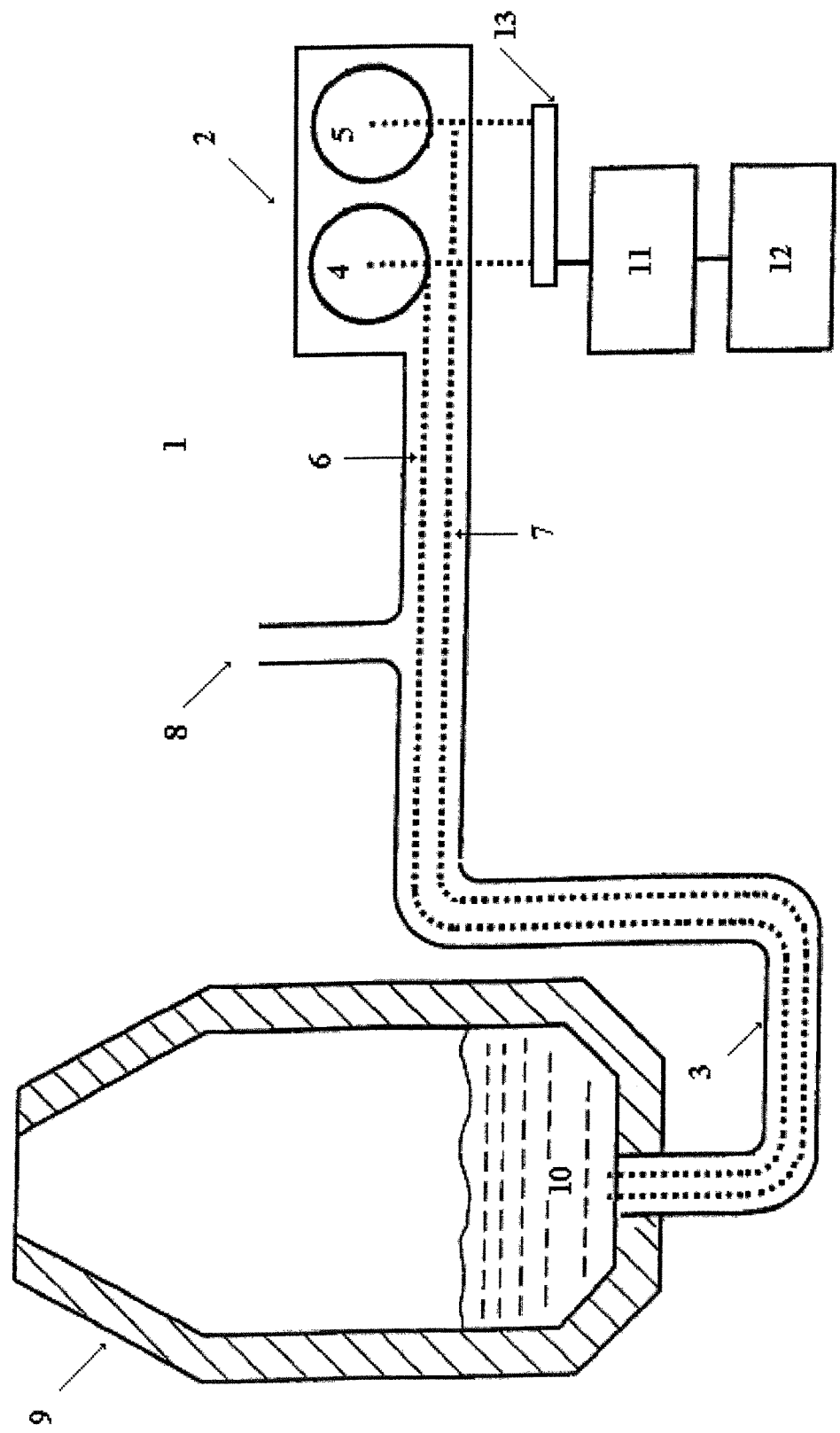

METHOD FOR OPTICALLY DETERMINING THE TEMPERATURE OF A MOLTEN METAL, AND REELING DEVICE FOR CARRYING OUT SAID METHOD

CROSS-REFERENCE TO RELATED APPLICATIONS

This application is a national phase application under 35 U.S.C. § 371 of International Patent Application No. PCT/EP2015/001715 filed Aug. 21, 2015, which claims priority to German Application No. 10 2014 012 697.8 filed Sep. 1, 2014, the entire contents of all of which are incorporated herein by reference in their entireties for all purposes.

FIELD OF THE INVENTION

The invention relates to a method for optically determining the temperature of a molten metal, and a reeling device for carrying out such a method.

BACKGROUND OF THE INVENTION

Such a method is known, for example, from WO 2007/079894 A1. In this method, an optical waveguide is supplied to a container of a converter, which receives molten metal. The task of the optical waveguide is to guide the electromagnetic radiation of the molten metal to an optical detector. A line through which fluid is flowed is arranged between the optical detector and the container, in which line the optical waveguide is guided and in which the optical waveguide is transported with the aid of the fluid. In one preferred embodiment, the invention comprises a reeling device, which successively reels off the optical waveguide from a stock. This is necessary because the high temperatures at the measurement point cause the optical waveguide to gradually melt at its end immersed in the molten metal and to require corresponding infeeding. If the optical waveguide has been entirely consumed, a new optical waveguide must be used.

In order to obtain reliable measurement values, such a method requires a calibration of the measuring device (test equipment) prior to the measurement, in particular after introduction of a new optical waveguide. In a calibration, the measurement value of test equipment (test value) is compared with the measurement value of a measurement standard (calibration value). If the difference between the test value and the calibration value is unacceptably large, an adjustment occurs. This involves setting or adjusting the measuring device in order to eliminate the systematic deviation to the extent required for the intended application. After the adjustment, another calibration must be realized. These steps must, if necessary, be repeated until an acceptable deviation is obtained. Measuring devices which have small measurement deviations are advantageously used as measurement standards.

Measurement standards usually require, in addition to the already existing measuring devices, additional access to the molten metal in order to determine the temperature. It is known, for example, that measuring rods with thermal elements mounted at the ends are introduced into the molten metal. This type of measurement is used, for example, in the converter process for steel production. The disadvantage of this is that the process must be interrupted. The period of time required for the temperature measurement and the corrective measures decided upon on the basis thereof complicates process control and the process sequence and thus has a negative impact on the steel quality.

Alternatively, pyrometers are used as measurement standards in order to determine the temperature in a molten metal. It is known from practical experience, for example, to realize a pyrometric analysis of the electromagnetic radiation emitted by the chalybeate bath for the purpose of continuous in situ temperature measurement. The surface of the chalybeate bath is thus observed for example. In this method, however, considerably fluctuating emissivity of the heterogenous and greatly agitated bath surface leads to unacceptable measurement uncertainty.

The provision of fixtures, such as windows, for example, in the fire-proof lining of a converter wall has also been considered. However, they are associated with disadvantages due to the optical degeneration caused by the high temperatures, which can typically reach as much as 1800° C. Access means provided in the fire-proof lining are also subject to significant mechanical stress as a result of settling processes, which deform the usually tube-shaped means of access to the molten mass to such an extent that an optical access to the chalybeate bath along the line of sight is no longer possible.

Such disadvantages are not restricted only to the converter process, but extend to almost all processes with molten metal. This might include, for example, the continuous casting process and the problematic accessibility to measurement points in the distribution trough, the immersion tube or in the permanent mold. Frequently, accessibility to certain measurement points is not possible generally or, for example for process-related reasons, at certain times.

SUMMARY OF THE INVENTION

Given this background, the invention addresses the problem of proposing a method for system-internal calibration of a measuring device and a reeling device for carrying out such a method in particular.

This problem is solved by the subject matter disclosed herein.

The invention is based on the basic principle that a measuring device with several measuring chains is calibrated in a system-internal manner. One calibrated measuring chain serves as a system-internal measurement standard for another measuring chain (replacement measuring chain).

The measuring device for optically determining the temperature of a molten metal thus has at least two measuring chains. According to the invention, a measuring chain comprises several measuring chain elements. The principle tasks of a measuring chain include the measurement recording, measurement signal processing and measurement value output. These tasks are realized by means of single or multiple measuring chain elements. Examples of measuring chain elements are sensors (for measurement value recording), computing units (for measurement signal processing) and display devices (for measurement value output).

According to the invention, a replacement measuring chain differs from the measuring chain through at least one measuring chain element. The replacement measuring chain preferably has a different measuring chain element for the measurement recording (measurement recorder) than the measuring chain. Particularly preferably, the other measuring chain elements are common measuring chain elements of the measuring chain and of the replacement measuring chain (branched measuring chains). The measurement deviation during calibration is then attributable to only one measuring chain element. This in particular simplifies the adjustment and reduces the number of measuring chain elements (devices). However, it is also conceivable that the measuring chain and the replacement measuring chain each have only their own measuring chain elements.

In the method according to the invention, the measuring chain has an optical waveguide as a measurement recorder and the replacement measuring chain has a replacement optical waveguide as a measurement recorder. The optical waveguide has the task of guiding electromagnetic radiation emitted from the metal or from the tip of the optical waveguide to an optical detector. The replacement optical waveguide is particularly preferably of the same type as the optical waveguide. It is, however, also possible to conceive of embodiments in which another type is used as the replacement optical waveguide, for example, when the replacement optical waveguide is to be used to measure the temperature in another treatment phase of the molten metal.

In one preferred embodiment, the measuring chain is calibrated by means of a system-external measurement standard. A "system-external measurement standard" shall be understood to mean a measurement standard which is not covered by the measuring device according to the invention. This is preferably a thermal element. In principle, however, any measuring devices for determining temperature, such as a pyrometer, for example, can be used as a system-external measurement standard.

In one preferred embodiment, the measuring device has a reeling device with a conveying device for successive reeling of the optical waveguide from a stock and of the replacement optical waveguide from a replacement stock. In a particularly preferred embodiment, the reeling device also has a receiving device for receiving a stock and at least one replacement stock. The stock and at least one replacement stock can thus be inserted into the receiving device. This can occur, for example, by means of pushing on, insertion, mounting or the like at the receiving point provided for the stock and the replacement stock (or replacement stocks) in the receiving device. The stock and the replacement stock (replacement stocks) are preferably introduced simultaneously or in one operation. If necessary, the introduction also comprises the connection of the optical waveguide and of the replacement optical waveguide (the replacement optical waveguides) to the conveying device and, if need be, additional measures so that the reeling can consequently take place, preferably automatically. The successive reeling can take place continuously or intermittently.

The use of the reeling device greatly simplifies the method according to the invention and results in an appreciable time saving. This makes it possible to achieve, for example due to the use of the stock and at least one replacement stock, long periods of use of the measuring device without interruptions for calibration, adjustment and stock changes (usage interval).

In one preferred embodiment, the calibration of the replacement measuring chain occurs shortly before consumption of the stock. The stock is considered to be consumed in particular when its portion provided for receiving the electromagnetic radiation of the molten metal has melted away. For logical reasons, the breaking away of the optical waveguide from the receiving device is not to be considered until shortly before the measurement point. Particularly preferably, the calibration of the replacement measuring chain occurs after the last measurement with the optical waveguide. The replacement optical waveguide is then usually located in the molten metal or in the vicinity of the molten metal so that, subsequent to the calibration and without noticeable interruptions, the measurement operation with the replacement optical waveguide can commence.

The calibration according to the invention of the replacement measuring chain can however in principle take place at any time. In particular, it may be advantageous to realize the calibration of the replacement measuring chain after the calibration of the measuring chain with an external measurement standard and before the first measurement with the optical waveguide. It is known that measuring devices and measuring chains have significant measurement uncertainty over the course of their use for technical reasons. The calibration of the replacement measuring chain after the calibration of the measuring chain with an external measurement standard and before the first measurement with the optical waveguide provides a very precise calibration value for adjustment of the replacement measuring chain.

In one preferred embodiment, the optical waveguide for determining the calibration value and the replacement optical waveguide for determining the test value record the electromagnetic radiation of the molten melt at the same measurement point. The term "measurement point" is to be interpreted in a broad sense and comprises both a measurement point in the molten metal or in the region of the molten metal as well as smaller or larger areas of the molten metal and of the region of the molten metal. In practice, in particular process-related factors should influence the choice of measurement point. A limited area is preferably chosen as the measurement point since the temperature gradient is usually small here and the calibration value and the test value are based on the same measurement variable. Particularly preferably, the calibration value and the test value are determined simultaneously or within a short time period.

In one preferred embodiment, an optical multiplexer controls whether the signal from the optical waveguide or the signal from the replacement optical waveguide is supplied to the optical detector.

According to the invention, the optical detector is used to determine the temperature of the metal from an analysis of the electromagnetic radiation transferred by the optical waveguide or replacement optical waveguide. The optical detector is preferably a common measuring chain element of the measuring chain and the replacement measuring chain. Particularly preferably, the measuring chain differs from the replacement measuring chain only in that the measuring chain has the optical waveguide as the measurement recorder and the replacement measuring chain has the replacement optical waveguide as the measurement recorder. The use of the optical multiplexer, which essentially realizes a switch function, makes it possible to use branched measuring chains. The optical multiplexer is not restricted to transferring signals from only two input lines to one output line. This allows the optical multiplexer to also be used with branched measuring chains with more than one replacement measuring chain.

In one preferred embodiment, a replacement measuring chain is calibrated by means of a previously calibrated replacement measuring chain as a system-internal measurement standard. A "system-internal measurement standard" shall be understood to mean a measurement standard which is covered by the measuring device according to the invention. Thanks to the system-internal calibration of a replacement measuring chain by means of a previously calibrated measuring chain, it is not necessary to carry out an external calibration once the replacement optical waveguide has been consumed. Instead, a second replacement optical waveguide can be used. In this way, it is possible (at least theoretically) for any length of chain of system-internally calibrated replacement measuring chains to be created. The usage interval of the measuring device can thus be extended significantly.

The problem is also solved by means of the reeling device disclosed herein.

The reeling device according to the invention serves to carry out a method for optically determining the temperature of a molten metal in which, by means of an optical waveguide, electromagnetic radiation emitted from the metal or from the tip of the optical waveguide is guided to an optical detector. Particularly preferably, the reeling device according to the invention serves to carry out the method according to the invention.

The high temperatures at the measurement point cause the optical waveguide, at its end immersed in the molten metal or brought into the immediate vicinity of the molten metal, to gradually melt and be consumed. The infeeding of the optical waveguide through the reeling device leads to a surface of the optical waveguide capable of receiving the electromagnetic radiation emitted by the metal or capable of emission of the representative electromagnetic radiation being always immersed in the molten metal or being located as close to the molten metal as is necessary for receiving or emitting the electromagnetic radiation.

The reeling device according to the invention has a receiving device for a stock and at least one replacement stock. Particularly preferably, the receiving device has receiving points for the stock and at least one replacement stock. A receiving point can, for example, be a bar-shaped device. This is particularly well suited to stock/replacement stock in the form of a drum winch with an axial central bore, by means of which the stock/replacement stock can be conveniently inserted into the bar-shaped device. The reeling device is preferably located in a housing. Alternatively, other devices can also be located in the housing such as parts of a measuring device, for example.

The reeling device according to the invention also has a conveying device for successive reeling of the optical waveguide from a stock and of at least one replacement optical waveguide from a replacement stock. In one preferred embodiment, the conveying device has at least one line which is flowed through by fluid. The optical waveguide and/or replacement optical waveguide is transported in the line by means of the fluid flow.

The same line which is flowed through by fluid is preferably used at least partially both for the transport of the optical waveguide and for the transport of at least one replacement optical waveguide. This results in a space-saving construction and reductions in materials and costs (for example, for the installation and maintenance of an additional line). Because the optical waveguide and the replacement optical waveguide are supplied to the measurement point via the same line, the measurement point for determining the calibration value and the test value is limited by the line cross section to an area which is normally very small. Embodiments in which different lines are provided for the transport of the optical waveguide and the replacement optical waveguide are also conceivable.

The line which is flowed through by fluid can be a transport line provided specifically for the supply of the optical waveguide/replacement optical waveguide, which can, for example, end above a free surface of the molten metal and which there brings the optical waveguide/replacement optical waveguide into contact or into the vicinity of the molten metal in order to record the electromagnetic radiation emitted by the metal. The transport line can also end at an opening provided in the wall of a container and supply the optical waveguide/replacement optical waveguide to the metal via this opening, wherein the fluid flowing in the line also has the advantage that it can at least partially prevent clogging of this opening. Alternatively and preferably, as the line for the transport of the optical waveguide/replacement optical waveguide, a fluid line system already provided on a container for receiving molten metal is used, such as the line system for the supply of treatment gas, for example. A combination of a transport line provided specially for the optical waveguide/replacement optical waveguide and an existing line system is also possible.

The optical waveguide/replacement optical waveguide can be provided with surface properties which permit a particularly good transfer of the transport force of the fluid to the optical waveguide/replacement optical waveguide, such as a special structuring of the surface of the optical waveguide/replacement optical waveguide, for example. In addition, a soft, flexible optical waveguide/replacement optical waveguide is preferably used, of the sort known from communications technology for example. They make it particularly easy to transport the optical waveguide around corners, constrictions or curves of the line system. The transport of the optical waveguide/replacement optical waveguide by means of the fluid flow can occur continuously or intermittently and can in particular be regulated.

In one preferred embodiment, the optical waveguide has no separate metal sheath.

In one preferred embodiment, an optical waveguide of the type G 62.5/125 with an external diameter of 0.9 mm is used. It has been proven to be advantageous, for example, to allow the fluid to flow through the line at a speed of 5 m/s.

As fluid for the transport of the optical waveguide in the line, preferably a fluid which is in any case necessary for the treatment of the molten metal, for example oxygen, is used, or alternatively other gases can also be used such as inert gases, for example.

In one preferred embodiment, the conveying device has at least two counter-rotating rollers, with at least one roller being able to be a drive roller. In one preferred embodiment, the optical waveguide and/or at least one replacement optical waveguide can be guided through the roller gap and transported by means of the rollers. The use of a pair of rollers can however also serve to control the reeling quantity of an optical waveguide transported solely by the fluid flow in the line. If the optical waveguide risks being carried away with the fluid flow, for example, the pair of rollers can then apply a retention force to the optical waveguide, by means of which the reeling can be controlled. Advantageously, the optical waveguide and at least one replacement optical waveguide can be transported by means of a respective roller unit (in particular a pair of rollers). However, transport by means of a common roller unit is also conceivable.

In one preferred embodiment, the stock and/or replacement stock is a spool. An optical waveguide/replacement optical waveguide wound around a drum winch could be suitable as a spool, for example. Alternatively, other stock/replacement stock such as for example an optical waveguide/replacement optical waveguide lying in loops, a ball or the like can be provided. One end of the optical waveguide/replacement optical waveguide of the stock/replacement stock is supplied to the measurement point by means of the conveying device, while the other end is connected to the detector.

BRIEF DESCRIPTION OF THE DRAWING

The invention is explained in greater detail below with reference to a drawing showing only one exemplary embodiment. The only FIGURE shown therein is a schematic depiction of the reeling device for carrying out a method for optically determining the temperature of a molten metal.

DETAILED DESCRIPTION

The FIGURE shows a reeling device 1 with a receiving device 2 and a conveying device 3.

A stock 4 and a replacement stock 5 are located in the receiving device 2. The stock is a spool, around which an optical waveguide 6 is wound. The replacement stock is also a spool, around which a replacement optical waveguide 7 is wound however.

The conveying device 3 is a line which is flowed through by fluid. In this example it serves both for the transport of the optical waveguide 6 and of the replacement optical waveguide 7. The transport fluid is introduced via a fluid input 8 into the line which is flowed through by fluid. (The fluid source is not depicted here.)

A container 9 is also depicted, which contains molten metal 10. The container 9 is connected to the line 3 flowed through by fluid by means of a floor opening.

If fluid flows via the fluid input 8 into the line 3 flowed through by fluid, the optical waveguide 6 or the replacement optical waveguide 7 is supplied to the molten metal 10 via the floor opening of the container 9. The optical waveguide 6 or replacement optical waveguide 7 there picks up the electromagnetic radiation of the molten metal 10 and guides it to an optical detector 11, which converts the optical signals into electrical signals. The electrical signals can be further processed by a signal analysis 12 in order to determine the temperature of the molten metal 10.

An optical multiplexer 13 is connected upstream of the optical detector. The optical multiplexer 13 controls whether the signal of the optical waveguide 6 or the signal of the replacement optical waveguide 7 is supplied to the optical detector 11.

In the depicted exemplary arrangement, both the optical waveguide 6 and the replacement optical waveguide 7 are located with their ends in the molten metal 10. This arrangement depicts in particular the moment of the system-internal calibration, in which the calibration value is determined by means of the optical waveguide 6 and the test value is determined by means of the replacement optical waveguide 7.

The invention claimed is:

1. A reeling device comprising:
    a receiving device configured to store an optical waveguide stock of an optical waveguide and a replacement optical waveguide stock of a replacement optical waveguide;
    a conveying device including a first end coupled to the receiving device and a second end in a vicinity of a molten metal, said conveying device configured to successively convey to the molten metal from said receiving device a first end of said optical waveguide and a first end of said replacement optical waveguide to maintain the first end of the optical waveguide and the first end of the replacement optical waveguide in contact with or in a vicinity of the molten metal;
    an optical detector configured to:
        receive an optical signal from at least one of a second end of the optical waveguide and a second end of the replacement optical waveguide; and
        convert the optical signal to an electrical signal corresponding to electromagnetic radiation emitted by the molten metal sensed by the corresponding one of the first end of the optical waveguide and the first end of the replacement optical waveguide.

2. The reeling device of claim 1, wherein the conveying device further includes a fluid input for receiving a flow of fluid into the conveying device which causes one or both of the optical waveguide and the replacement optical waveguide to be conveyed to the molten metal.

3. The reeling device of claim 1, wherein the conveying device includes at least two counter-rotating rollers configured to convey one or both of the optical waveguide and the replacement optical waveguide through a gap between the at least two counter-rotating rollers.

4. The reeling device of claim 3, wherein at least one roller of the at least two counter-rotating rollers comprises a drive roller.

5. The reeling device of claim 3, wherein the at least two counter-rotating rollers are configured to apply a retention force to one or both of the optical waveguide and the replacement optical waveguide to control a quantity of the one or both of the optical waveguide and the replacement optical waveguide conveyed through the conveying device.

6. The reeling device of claim 1, further comprising:
    an optical multiplexer coupled to the second end of the optical waveguide, the second end of the replacement optical waveguide, and the optical detector, said optical multiplexer configured to transmit, to the optical detector, the optical signal from one of the second end of the optical waveguide and the second end of the replacement optical waveguide.

7. The reeling device of claim 1, further comprising:
    a signal analysis module, coupled to the optical detector, and configured to receive the electrical signal from the optical detector and determine a temperature of the molten metal based upon the electrical signal.

8. The reeling device of claim 1, wherein the optical waveguide stock and the replacement optical waveguide stock are stored on drum winch spools in the receiving device.

9. The reeling device of claim 1, wherein the conveying device comprises a fluid line.

10. The reeling device of claim 1, further comprising a measuring chain and a replacement measuring chain, wherein the measuring chain includes the optical waveguide and the replacement measuring chain includes the replacement optical waveguide.

11. A method for optically determining a temperature of a molten metal, comprising:
    successively conveying to the molten metal a first end of an optical waveguide and a first end of a replacement optical waveguide from an optical waveguide stock and a replacement optical waveguide stock stored in a receiving device configured to store the optical waveguide stock and the replacement optical waveguide stock, to maintain the first end of said optical waveguide and the first end of said replacement optical waveguide in contact with or in a vicinity of the molten metal, the conveying being by a conveying device having a first end coupled to the receiving device and a second end in the vicinity of the molten metal;
    receiving, by an optical detector, coupled to one or both of a second end of the optical waveguide and a second end of the replacement optical waveguide, an optical signal sensed by one of the first end of the optical waveguide and the first end of the replacement optical waveguide;

converting, by the optical detector, the optical signal to an electrical signal corresponding to electromagnetic radiation emitted by the molten metal; and transmitting the electrical signal to a signal analysis module for determination of the temperature of the molten metal.

12. The method of claim 11, wherein a measuring chain includes the optical waveguide and a replacement measuring chain includes the replacement optical waveguide.

13. The method of claim 12, further comprising:

calibrating the replacement measuring chain based on the measuring chain as a system-internal measurement standard; and calibrating the replacement measuring chain before consumption of the optical waveguide stock.

14. The method of claim 12, further comprising:

calibrating the measuring chain based on a system-external measurement standard.

15. The method of claim 13, further comprising:

conveying the first end of the optical waveguide and the first end of the replacement optical waveguide to a common measurement area;

wherein calibrating the replacement measuring chain based on the measuring chain as a system-internal measurement standard comprises determining a calibration value based upon a first optical signal sensed by the first end of the optical waveguide and determining a test value based upon a second optical signal sensed by the first end of the replacement optical waveguide.

16. The method of claim 12, wherein the measuring chain and the replacement measuring chain comprise a branched measuring chain.

17. The method of claim 11, further comprising:

receiving, by an optical multiplexer, connected to the optical waveguide at the second end of the optical waveguide, and to the replacement optical waveguide at second end of the replacement optical waveguide, and connected to the optical detector, a first optical signal from the optical waveguide and a second optical signal from the replacement optical waveguide; and multiplexing, by the optical multiplexer, one of the first optical signal from the optical waveguide and the second optical signal from the replacement optical waveguide as an output of the optical multiplexer;

wherein receiving, by the optical detector, the optical signal sensed by one of the first end of the optical waveguide and the first end of the replacement optical waveguide comprises receiving, by the optical detector from the optical multiplexer, the output one of the first optical signal from the optical waveguide and the second optical signal from the replacement optical waveguide.

18. The method of claim 11, wherein successively conveying to the molten metal a first end of said optical waveguide and a first end of said replacement optical waveguide from said optical waveguide stock and said replacement optical waveguide stock stored in said receiving device comprises:

inputting, into a fluid input of the conveying device, fluid to cause conveying of the first end of said optical waveguide and the first end of said replacement optical waveguide to the molten metal; and reeling off, from the optical waveguide stock and the replacement optical waveguide stock, the optical waveguide and the replacement optical waveguide to facilitate conveying of the first end of said optical waveguide and the first end of said replacement optical waveguide to the molten metal.

19. The method of claim 11, wherein conveying the first end of said optical waveguide and the first end of said replacement optical waveguide to the molten metal comprises conveying the first end of said optical waveguide and the first end of said replacement optical waveguide to the molten metal by at least two counter-rotating rollers configured to convey the optical waveguide and the replacement optical waveguide through a gap between the at least two counter-rotating rollers.

20. The method of claim 19, further comprising:

applying, by the at least two counter-rotating rollers, a retention force to the optical waveguide and the replacement optical waveguide to control a quantity of the optical waveguide and the replacement optical waveguide conveyed through the conveying device.

* * * * *